Aug. 29, 1972  H. E. LA BELLE, JR., ET AL  3,687,633
APPARATUS FOR GROWING CRYSTALLINE BODIES FROM THE MELT
Filed Aug. 28, 1970  2 Sheets-Sheet 1

Harold E. Labelle, Jr.
Charles J. Cronan
INVENTORS

BY Schiller & Pandiscio
ATTORNEYS

Harold E. Labelle, Jr.
Charles J. Cronan
INVENTORS.

United States Patent Office 3,687,633
Patented Aug. 29, 1972

3,687,633
APPARATUS FOR GROWING CRYSTALLINE
BODIES FROM THE MELT
Harold E. La Belle, Jr., Quincy, and Charles J. Cronan, Taunton, Mass., assignors to Tyco Laboratories, Inc., Waltham, Mass.
Filed Aug. 28, 1970, Ser. No. 67,808
Int. Cl. B01j *17/18*
U.S. Cl. 23—273 SP          21 Claims

ABSTRACT OF THE DISCLOSURE

The invention is an improvement in apparatus for growing crystalline bodies from the melt. The apparatus comprises a novel crucible arrangement and a novel "die" assembly which determines the cross-sectional shape of the crystalline body.

---

This invention relates to apparatus for growing crystalline bodies from the melt and more particularly to dies for growing crystals according to the EFG process.

The term "EFG" stands for edge-defined, film-fed growth and designates a process for growing crystalline bodies which is described in Argentine Pat. No. 165,996 dated Apr. 7, 1969 and the corresponding U.S. patent application of Harold A. La Belle, Jr., Ser. No. 700,126, filed Jan. 24, 1968 for Method of Growing Crystalline Materials.

In the EFG process the shape of the crystalline body that is produced is determined by the external or edge configuration of the end surface of a forming member which for want of a better name is called a die, although it does not function in the same manner as a die. An advantage of the process is that a variety of complex shapes can be produced commencing with the simplest of seed geometries, namely, a round small diameter seed crystal. The EFG process involves growth on a seed from a liquid film of feed material sandwiched between the seed or body growing on the end of the seed and the end surface of the die, with the liquid in the film being continuously replenished from a reservoir of molten feed material contained in a crucible by action of capillary rise in one or more capillaries in the die. The film spreads across the full expanse of the die's end surface to the edge thereof formed by intersection with the side surface or surfaces of the die. The angle of intersection of the aforesaid surfaces of the die is such relative to the contact angle of the film that the liquid's surface tension will prevent it from overrunning the edge of the die's end surface. Preferably the angle of intersection is a right angle which is simplest to achieve and thus most practical to have. The growing body grows to the shape of the film which conforms to the edge configuration of the die's end surface. Since the liquid film has no way of discriminating between an outside edge and an inside edge of the die's end surface, a continuous hole may be grown in the crystalline body by providing in that surface an appropriate hole of the same shape as the hole desired in the crystalline body, provided, however, that any such hole in the die's surface is made large enough so that surface tension will not cause the surrounding film to fill in over the hole. The descriptive term "edge-defined, film-fed growth" is derived from the fact that the shape of the growing crystalline body is defined by the edge configuration of the die and growth takes place from a liquid film of liquid which is continuously replenished so as to provide a constant source of feed material. The EFG process has been used to grow both monocrystalline and polycrystalline bodies but its main advantage is that it permits growth of monocrystalline bodies of various materials in various cross-sectional configuration and sizes, e.g. solid round rods, rectangular ribbons and plates, and cylindrical tubes. Among the materials that have been grown by the EFG process as monocrystalline bodies are α-alumina, spinel, chrysoberyl, and barium titanate.

An essential requirement of the EFG process is that the crucible and die member be made of a composition that will withstand the operating temperatures and will not react with the melt. Because of the properties of the crystalline materials that are processed into diverse crystalline shapes by the EFG process, e.g. alumina, only a limited number of metals and metal alloys can be used to fabricate the die members and crucibles, and such metals and alloys are either costly or difficult to machine or both. For example, the dies and crucibles used in growing α-alumina bodies are generally made of either molybdenum or tungsten, both of which are relatively expensive and difficult to machine. This is especially so in the case of die members used to grow tubing to close tolerances since the capillaries and the film-supporting end surfaces also must be made to close tolerances.

Accordingly the object of this invention is to provide new and improved apparatus for growing crystalline bodies from the melt by the EFG process.

Another object is to provide new and improved die members for growing tubular crystalline bodies by the EFG process.

Still another object is to provide a novel crucible-die member assembly for growing crystalline bodies by the EFG process which includes an expendable crucible liner.

A further object is to provide a die for growing tubular crystalline bodies by the EFG process which is comprised of concentric members with the dimensions of the film supporting end surface of the die being determined by the said members.

Described briefly, the invention whereby the foregoing objects are achieved comprises a crucible with an expendable liner and a die assembly mounted in the crucible. The die assembly comprises a supporting plate which fits within and is positioned by the crucible and one or more die members supported by the aforesaid plate. Each of the die members has a top end surface for supporting a film of melt and at least one capillary with a bottom end that communicates with the melt in the liner and a top end that terminates in said top end surface. The die member is made of two parts that cooperate to define the capillary. For growing tubular bodies, the die member preferably comprises two cylinders sized to fit within one another with an intervening capillary space and means formed integral or separate from said cylinders for maintaining said cylinders in concentric relation to each other. The same crucible-liner arrangement may be used to accommodate a die member designed for growing flat ribbon-like crystalline bodies, the latter die member also comprising two parts secured together so as to define a capillary.

Other features and many of the attendant advantages of this invention are set forth or rendered obvious by the following detailed description which is to be considered together with the accompanying drawings wherein.

Figure 1:
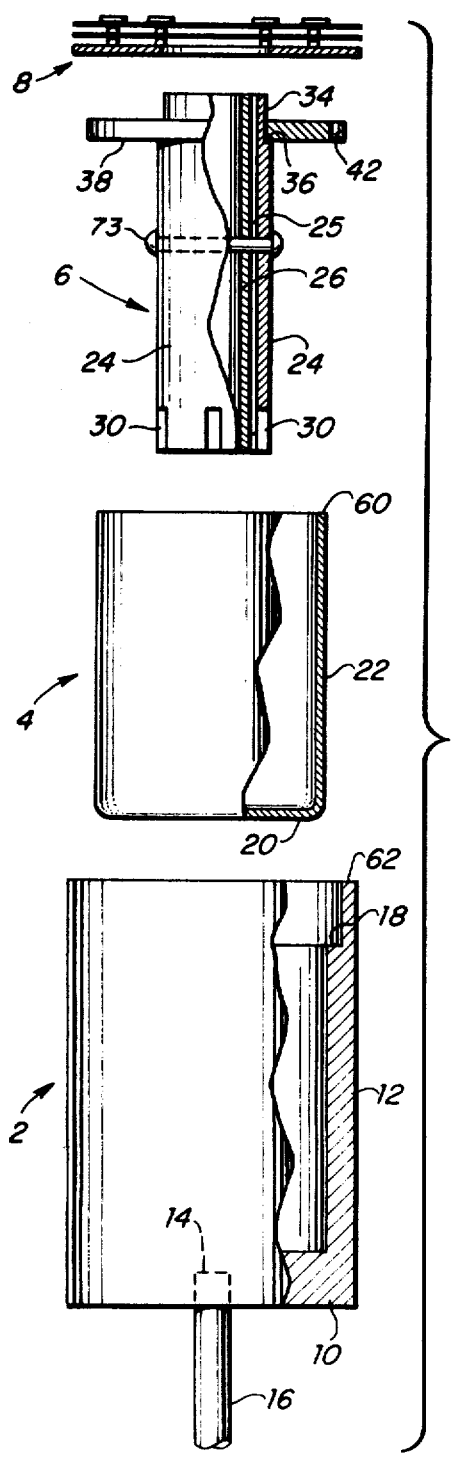
FIG. 1 is an exploded view of apparatus comprising a crucible, crucible liner, die member assembly and radiation shield used to grow tubular bodies.

Turning now to FIG. 1 the illustrated apparatus comprises a crucible 2, a crucible liner 4, a die member assembly 6, and a radiation shield assembly 8. The crucible 2 comprises a bottom wall 10 and a cylindrical side wall 12. The bottom wall 10 is provided with a cavity as shown at 14 to accommodate a supporting rod 16 which is used to support the crucible within a suitable furnace enclosure. The crucible 2 is open at its top end and its cylindrical wall 12 is undercut so as to provide an interior annular shoulder 18 spaced a short distance from the upper end of the crucible. The liner 4 comprises a bottom wall 20 and a side wall 22 and is also open at its top end.

The die member assembly 6 shown in FIG. 1 is adapted for growing tubular bodies from the melt. The die member 6 comprises two cylindrical sleeves 24 and 26. Sleeve 24 has an inside diameter greater than the outside diameter of the inner tube or sleeve 26, so as to provide a gap therebetween of capillary proportions. The tube 26 is spaced from the tube 24 and is held in concentric relation therewith by a plurality of spacer elements in the form of small diameter wires or rods which are not visible in FIG. 1 but which are shown at 29 in FIG. 2. The outer sleeve 24 is provided with one and preferably a plurality of slots 30 at its bottom end to permit inflow of melt to the capillary. The upper end of sleeve 24 is undercut as shown at 34 so as to provide a shoulder 36 which acts as a stop for a plate 38. The plate 38 is circular and has a central hole whereby it can be fitted onto the sleeve 24. The central hole in the plate 38 is sized so that the plate 38 can be press fitted onto sleeve 24. Although not shown, it is also contemplated that the plate 38 may be secured onto the sleeve 24 by staking. The plate 38 has an outside diameter such that it will fit within the upper end of the crucible 2 and rest on the shoulder 18. Preferably the overall length of the tubes 24 and 26 are set so that the plate 38 can rest on the shoulder 18 with the bottom ends of the sleeves just engaging or being slightly spaced from the bottom wall 10 of the crucible. Alternatively, the sleeves 24 and 26 may be sufficiently long so that the plate 38 fits within the groove formed in the upper end of the crucible but does not engage the shoulder 18, in which case the plate 38 acts as a centering device. Although not necessary, it is preferred that the plate 38 be provided with a hole 42 which may be used to accommodate a filler tube for feeding additional feed material to the melt or for permitting access to the melt of suitable temperature measuring means.

The radiation shield 8 is not essential to the invention but is used to reduce heat loss by radiation and also to assure a flat temperature profile horizontally across the upper end surfaces of the sleeves 24 and 26.

Figure 2:
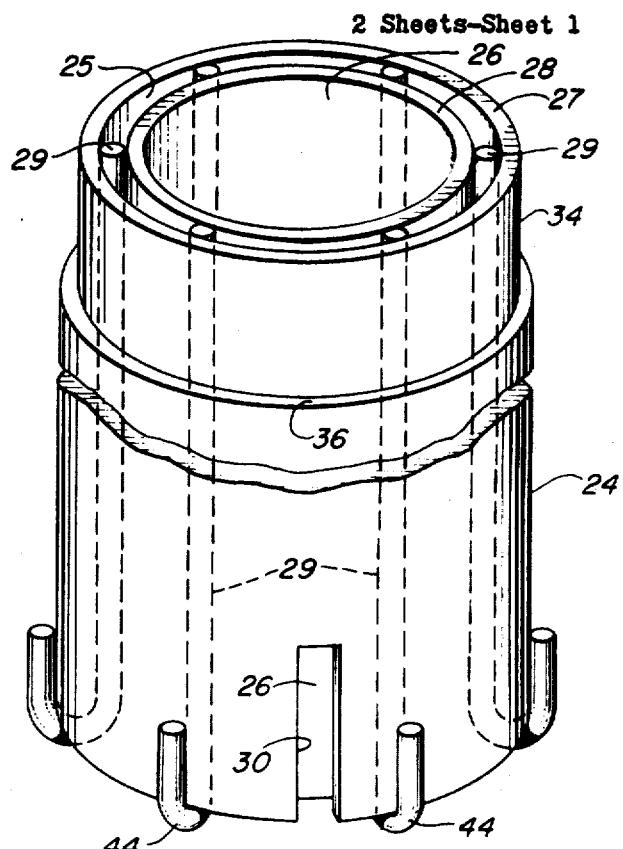
FIG. 2 is a perspective view illustrating how the die member assembly of FIG. 1 is constructed.
Figure 3:
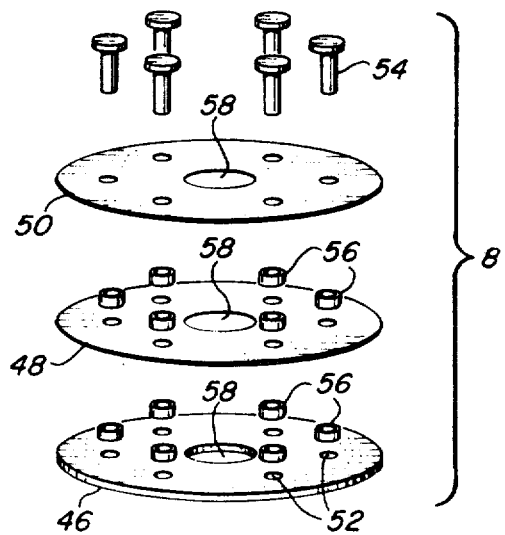
FIG. 3 is an exploded view of the radiation shield shown in FIG. 1.

Referring now to FIG. 2, the sleeves 24 and 26 are formed with flat end surfaces 27 and 28 respectively, which are located in a common plane and together constitute the upper end surface of the die member assembly 6. The die member is assembled by providing a number of wire rods 29 with a length greater than the overall length of the two sleeves and bending the wire rods so as to form hooked ends as shown at 44. The sleeve 24 is inverted from the position shown in FIG. 2 and the wire rods 29 inserted so that their hooked ends 44 overlie and engage the bottom end surface of the sleeve. Then the sleeve 26 is inserted into the sleeve 24 through the bottom end of the latter. The wire rods 29 are chosen with a diameter such that the sleeve 26 makes a tight fit and forces the rods into tight engagement with the inner surface of the sleeve 24. The rods 29 are spaced more or less symmetrically as shown so as to provide concentric spacing of the two sleeves and terminate flush with or short of the end surfaces 24A and 26A. After the two sleeves have been assembled with the wire rods in place, the hooked ends of the wire rods are removed by grinding, with the result that the wire rods are co-extensive with the sleeves 24 and 26. Then the plate 38 is press fitted onto the sleeve 24 into tight engagement with its shoulder 36.

The radiation shield 8 is preferably made with a plurality of discs such as shown at 46, 48, and 50. The disc 46 preferably is made slightly thicker than the discs 48 and 50. The discs are assembled to form a unitary structure. In this connection it is to be noted that the disc each have a series of holes 52 sized to accommodate rivets 54. The three discs are spaced from one another by means of small annular spacers 56. The spacers 56 have an inside diameter just large enough to accommodate the rivets 54. The rivets are peened over on the lower side of disc 46 to secure the discs as a unitary assembly. The discs 46, 48, and 50 each has a central aperture 58 which is just large enough to fit around the upper end of the sleeve 24. The outside diameter of the discs 46, 48, and 50 is substantially the same as that of the crucible so that the radiation shield can rest on top of the crucible.

The liner 22 has a height such that its upper edge 60 is flush with or preferably silghtly below the shoulder 18 of the crucible 2. The sleeves 24 and 26 project above the plate 38 by an amount such that they are lower than the upper edge 62 of the crucible and flush with or slightly below the lower disc 46 of radiation shield 8.

The spacing between the two sleeves 24 and 26 must be in such porportion as to enable the annular space 25 between the two sleeves to function as a capillary with a capillary rise sufficient for melt at the bottom end of the sleeves 30 to rise up to the top of the capillary space. The exact size of the spacing between the two sleeves is selected according to the surface energy of the melt material so as to provide capillary action. For a given melt material, the distance the melt can rise in a capillary such as capillary 25 or the size of the gap required to be provided between sleeves 24 and 26 so that the annular space 25 will function as a capillary capable of providing capillary rise to a predetermined height (e.g., to the height of end surfaces 27 and 28) can be approximated by the equation:

$$h = \frac{2T(R_1+R_2)}{Dg(R_2^2 - R_1^2)}$$

where $h$ is the height in centimeters, T is the surface tension in dynes/cm., D is the density of the melt in grams/cc., $R_1$ is the outside diameter of tube 26 and $R_2$ is the inside diameter of tube 24, and $g$ is the gravitational constant in cm./sec.$^2$. In this connection it is to be noted that relatively long columns of materials such as liquid alumina can be achieved by action of capillary rise. By way of example, if an elongate capillary of circular cross-section has a diameter of 0.75 mm., a column of molten alumina may be expected to rise more than 11 cm. therein. Therefore, it is believed to be apparent that the height of the die member assembly and also of the crucible in which it is mounted may be of substantial magnitude and still achieve the desired capillary rise. The important thing is that the upper surface of the die assembly be above the level of the melt in the crucible at all times and that the differential in height between the level of the melt and said surface never exceed the height to which the melt can rise by capillary action. In practice it is preferred that the difference in height between the surfaces 24A and 26A and the bottom of the crucible be less than the maximum height that the melt can rise in capillary 25, so that crystal growth can be continued until the melt in the crucible is almost completely consumed. By way of example, tubes of monocrystalline α-alumina have been grown with a wall thickness of .08 cm. with apparatus as shown in FIG. 1 using a capillary member where the two tubes 24 and 26 had an overall length of 4.2 cm. with tube 24 having an O.D. of .96 cm. and an I.D. of .90 cm. and tube 26 having an O.D. of .86 cm. and an I.D. of .80 cm., so that the capillary gap measured .02 cm.

The arrangement shown in FIG. 1 offers a number of advantages. For one thing the liner 4 can be made with a thinner wall than the crucible 12 since the crucible provides the needed support. For example, in practice a liner with a wall thickness of .025 cm. is used with a crucible having a side wall thickness of .3 cm. On the other hand because the liner 4 is made thinner, it is far less expensive to fabricate than the crucible 12 and can be discarded after being used once or twice while the crucible 12 may be reused many times. The liner can be fabricated by spinning or deep drawing techniques. The die member assembly offers the advantages that the area of its effective end surface (which comprises the end surfaces 27 and 28 of the two sleeves and has the O.D. of sleeve 24 and I.D. of sleeve 26) can be precisely determined, as can the spacing between the two sleeves through which the melt rises by capillary action. The sleeves 24 and 26 may be made by extrusion and simply cut to size, with the shoulder 36 being made by machining. Alternatively, the sleeves 24 and 26 may be made by turning down tubing stock. Since the sleeves 24 and 26 are separate members, it is possible to replace one or the other with tubing of different wall thicknesses and thereby vary the total area and inner or outer dimensions or both of the end surface of the die member. Thus it is possible to have a die member wherein the inner tube 26 has a smaller or greater wall thickness than the outer tube 24. It is also possible to substitute the sleeve 24 with another sleeve having a cylindrical inner surface but an outer surface that undulates or has longitudinally extending ribs, with the result that the effective end film-supporting surface of the die member will have a circular inner edge and an outer edge that is generally circular but undulates or has rib-like projections. It is also possible to replace the sleeve 26 with another sleeve having a cylindrical outer surface that engages the wire rods 29 and an inner surface that undulates or has longitudinal ribs, in which case the end surface of the die member will have a cylindrical outer edge and an inner edge that is generally circular but undulates or has rib-like projections. It is also possible to replace the sleeve 26, for example, with a sleeve having a circular or cylindrical outer surface and square or rectangular inner surface. In other words, the sleeve 26 could have an axial bore that is rectangular or square in cross-section instead of circular as shown. By the same measure the sleeve 24 could be replaced with a sleeve having a cylindrical inner surface and an outer surface that has a square, triangular, or rectangular configuration. It is also possible for both of the sleeves 24 and 26 to be noncircular in cross-section, just so long as they are made so as to permit them to be correctly spaced by means of the wire rods 28. In any event, whatever the cross-section of sleeves 26 and 28, crystals growing according to the EFG process will be shaped according to the outer edge configuration of sleeve 24 and the inner edge configuration of sleeve 26.

Figure 4:
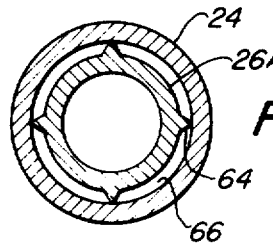
FIG. 4 is a cross-sectional view of a second form of die member for growing tubular bodies.

FIG. 4 shows a modification of the die member assembly of FIG. 1. In FIG. 4 the sleeve 26 has been replaced by the sleeve 26A which has a cylindrical outer surface provided with a series of more or less evenly spaced longitudinally extending ribs 64. The ribs 64 have a radial dimension corresponding to the diameter of each of the rods 29, with the result that when the sleeve 26A is inserted in the sleeve 24, the ribs 64 will make a press fit with the sleeve 24 and hold the two sleeves in concentric relation with an intervening gap 66 that is dimensioned so as to function as a capillary. While manufacture of sleeve 26A is somewhat more expensive than the manufacture of the straight sleeve 26, assembly is facilitated since there is no need for using the wire rods 29.

Figure 5:
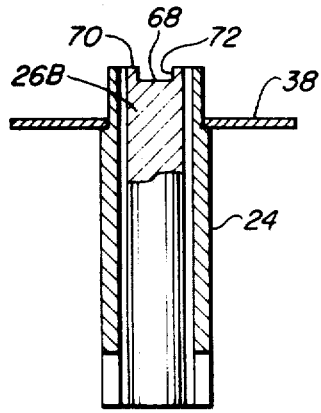
FIG. 5 is a vertical sectional view showing a third form of die member for growing tubular bodies.

FIG. 5 shows still another form of die member assembly for growing tubular bodies. In this case the sleeve 26 of FIG. 2 has been replaced by a solid rod 26B with the same outside diameter as the sleeve 26. The rod 26B is provided with a cavity or depression 68 at its upper end which is sized so that its end surface 70 has the I.D. and O.D. of the top end surface 28 of sleeve 26. The depression or cavity 68 is formed with straight sided walls 72 so that a film of melt disposed on the end surface of the die assembly will not run over into the depression because of surface tension. Although the rod 26B is preferably spaced from the sleeve 24 by means of wire rods 29 as in FIG. 2, it is to be understood that the rod 26B could be formed with ribs such as shown at 64 in FIG. 4, in which case the wire rods 29 are omitted.

A further modification consists of employing additional means to secure the inner and outer concentric members of the die member assemblies described above to prevent them from shifting longitudinally relative to one another. Preferably this additional means comprises one or more transversely extending pins 73 (see FIG. 1) which extend diametrically through both of the sleeves 24 and 26.

Figure 6:
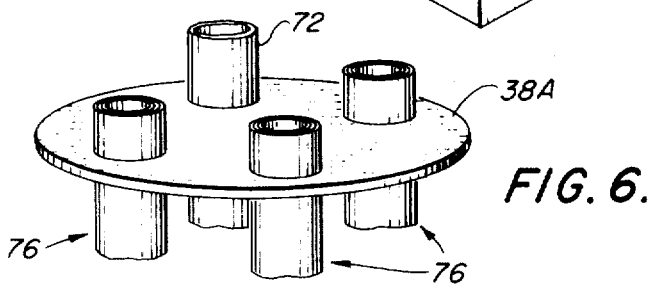
FIG. 6 is a fragmentary perspective view of a die member assembly for growing three tubular bodies simultaneously.
Figure 7:
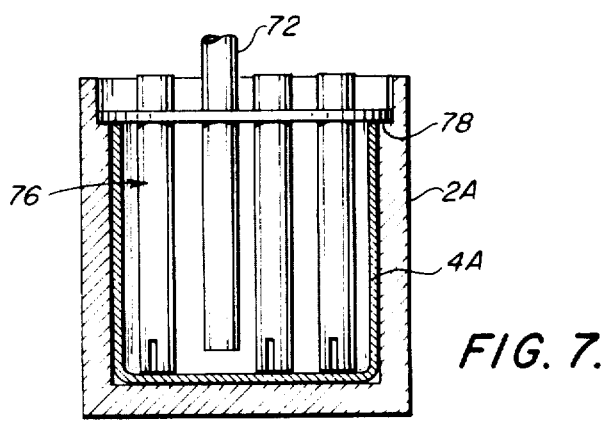
FIG. 7 is a vertical sectional view showing the die member assembly of FIG. 6 disposed in a crucible with an expendable liner.

It is also to be noted that more than one die member may be supported by the plate 38. Thus if it is desired to grow a plurality of crystalline bodies simultaneously, it is contemplated that the plate 38 would be made large enough to accommodate a plurality of die members. FIG. 6 shows a plate 38A which supports a plurality of die members 76 which are preferably of the construction shown in FIGS. 1 and 2. Additionally, the plate 38A may support a hollow tube 78 which functions as a filler tube. As seen in FIG. 7, the assembly of FIG. 6 is mounted in a crucible of larger cross-section than the one shown in FIG. 1. The crucible 2A contains a liner 4A similar to the liner 4 described above. The plate 38A fits within the crucible 2A and rests on the annular shoulder 18A corresponding to the shoulder 18 of FIG. 1. The several die members 76 extend down to just short of the bottom surface of the liner 4A. The filler tube 78 extends down into the crucible far enough so that introduction of additional feed material in solid or liquid form will not unduly disturb the melt in the crucible. Obviously more than three die members may be supported by the plate 38A, the actual number depending upon the size of plate 38A and the size of the crucible 24A with its liner 4A and also the capability of the furnace to pull the desired number of crystalline bodies.

Figure 10:
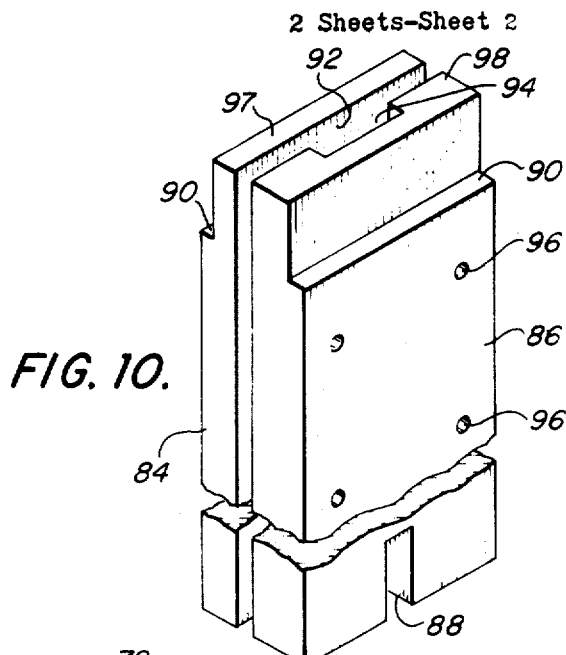
FIG. 10 is an enlarged exploded perspective view of the die member of FIG. 8.
Figure 9:
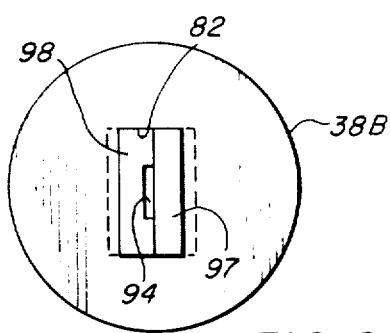
FIG. 9 is a plan view of the apparatus of FIG. 8.
Figure 8:
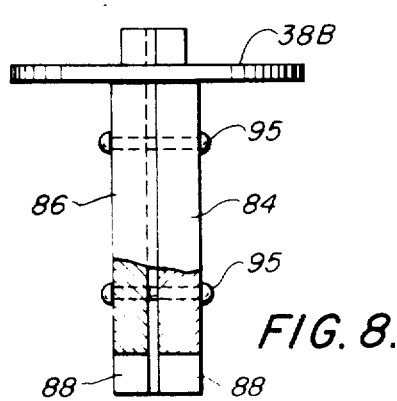
FIG. 8 is a side elevation, partly in section, of a die member assembly for growing ribbon.

FIGS. 8, 9, and 10 show a modification of the die member used to grow ribbon-like crystalline bodies. As seen in FIG. 8, the die member for growing ribbon-like bodies includes a plate 38B which is similar to the plate 38 except that it has a rectangular hole 82 at its center.

The plate 38B supports a die member made up of two parts 84 and 86. As seen in FIG. 7, the two parts 84 and 86 are constructed of rectangular stock. Both parts are formed with longitudinal slots 88 at their bottom ends for inflow of melt to the capillary hereinafter described. The two parts are undercut at their upper ends so as to form exterior shoulders 90 which function as stops for the plate 38B. The two parts 84 and 86 fit together and the plate 38B is press fitted onto them so as to form a solid unit. The inner surface of the part 84 is flat as shown at 92. However, the inner surface of the part 86 is provided with a longitudinally extending groove 94 of rectangular configuration as shown. The groove 94 is formed so that when the two parts 84 and 86 are placed together it will function as a capillary. The width of the groove, i.e., the vertical dimension as shown in FIG. 9, need not be to capillary proportions but may be substantially larger and may extend out to just short of the small side surfaces of the part 86. Obviously, the groove 94 need not be rectangular as shown, but may in fact be semi-circular in cross-section. Moreover, more than one groove may be formed in the part 86 or alternatively in the part 84. The parts 84 and 86 are secured together by a plurality of rivets 95 which extend through suitable openings 96 formed in the two parts. The upper end of the die member comprised of the parts 84 and 86 extends above the plate 38B. The upper end surfaces 97 and 98 of the two parts are flush with each other and terminate in right angle edges. Together upper end surfaces 97 and 98 form a rectangular end surface for the die member, with this rectangular end surface having an opening therein formed by the capillary 94. Accordingly the die member may be used to grow monocrystalline ribbon of rectangular cross-section according to the EFG process.

It is to be noted that the crucibles, crucible liners and die members may be formed of various materials depending upon the composition of the crystalline bodies to be grown. By way of example, if alumina bodies are to be grown from the melt according to the EFG process described, the components shown in the drawings are preferably made of molybdenum or tungsten or even iridium.

It also is to be noted that the plates 38 shown in the drawings may be sized so as to rest solely on the crucible liners, in which case the crucibles need not have shoulders as shown at 18 in FIG. 1.

We claim:

1. Apparatus for use in growing crystalline bodies from the melt by the EFG process comprising a crucible assembly that includes a crucible and a crucible liner each open at the top and each having a bottom wall and a side wall, said liner being removably positioned in said crucible; and a die assembly comprising a plate located at the top end of said crucible and closing off the interior space of said liner, and a die that is secured in a hole in said plate and comprises two separate parts that extend down into the interior space of said liner, said die having a flat top end surface located on the upper side of said plate, said parts being mounted with respect to each other in cooperating relationship to form a capillary passage having one end terminating in said top end surface and a bottom end that communicates with the interior space of said crucible liner adjacent the bottom wall of said crucible liner, said parts being substantially coextensive with each other above the bottom end of said capillary passage.

2. Apparatus according to claim 1 wherein said plate engages and is supported by said crucible assembly.

3. Apparatus according to claim 2 wherein said two parts are in spaced concentric relation to each other, with one part attached to said plate.

4. Apparatus according to claim 3 wherein said parts are tubular.

5. Apparatus according to claim 3 wherein one of said parts is a tube and the other is a solid rod disposed within said tube.

6. Apparatus according to claim 18 further including spacer means between said parts.

7. Apparatus according to claim 6 wherein said spacer means comprises a plurality of elongate wires frictionally engaged by said parts.

8. Apparatus according to claim 6 wherein said spacer means is integral with one of said parts.

9. Apparatus according to claim 1 wherein said parts are cylindrical tubes.

10. Apparatus according to claim 3 wherein said parts are in face to face engagement with each other, and said capillary comprises a groove in one of said parts.

11. Apparatus for use in growing crystalline bodies from the melt by the EFG process comprising a plate and at least one die mounted in a hole in said plate, said die comprising two separate concentric parts extending through said plate that are mounted with respect to each other in cooperating relationship so as to provide a flat end surface at one end of said die and also so as to form at least one capillary passage having one end terminating in said end surface and another end that communicates with an opening adjacent the opposite end of said die, said parts being substantially coextensive with each other above the bottom end of said capillary passage.

12. Apparatus according to claim 11 wherein one of said two parts is attached directly to said plate and the other part is spaced from said plate and is mounted to said one part.

13. Apparatus according to claim 12 wherein said two parts are tubular.

14. Apparatus according to claim 13 wherein said two parts are cylindrical tubes.

15. Apparatus according to claim 12 further including spacer means between said two parts.

16. Apparatus according to claim 15 wherein said spacer means comprises a plurality of mutually spaced wires frictionally engaged by said two parts.

17. Apparatus according to claim 15 wherein said spacer means comprises a plurality of ribs integral with at least one of said parts.

18. Apparatus for use in growing tubular crystalline bodies from the melt by the EFG process comprising a crucible open at the top and having a bottom wall and a side wall; and a die assembly mounted in said crucible; said die assembly comprising a plate located at and extending across the top end of said crucible, and a die that is secured in a hole in said plate and extends down into the interior space of said crucible, said die comprising first and second discrete parts that are formed as separate members and united in said die assembly, said first part being tubular and disposed in surrounding coaxial relation to said second part, said parts cooperating to provide a flat top end surface located on the upper side of said plate and also to form at least one capillary having one end terminating in said top end surface and a bottom end that communicates with the interior of said crucible adjacent the bottom end of said crucible, said parts being substantially coextensive with each other above the bottom end of said capillary passage.

19. Apparatus according to claim 18 wherein one of said two parts is secured to said plate and the other part is spaced from said plate, and further including means holding said parts in radially-spaced relation to each other, with said capillary passage being the space between said parts.

20. Apparatus according to claim 18 wherein the top end of said die projects above said plate, and further including a radiation shield surrounding said top end of said die.

21. Apparatus for use in growing crystalline bodies from the melt by the EFG process comprising a crucible open at the top and having a bottom wall and a side wall; and a die assembly comprising a plate located at the top end of said crucible and closing off the interior space of said crucible, and a die that is secured in a hole in said plate and comprises two separate parts that extend down into the interior space of said crucible, said die having a flat top end surface located on the upper side of said plate, said parts being mounted with respect to each other in cooperating relationship to form a capillary passage having one end terminating in said top end surface and a bottom end that communicates with the interior space of said crucible adjacent the bottom wall of said crucible, said parts being substantially coextensive with each other above the bottom end of said capillary passage.

References Cited

UNITED STATES PATENTS

| | | | |
|---|---|---|---|
| 3,591,348 | 7/1971 | La Belle Jr. | 23—301 SP |
| 3,261,671 | 7/1966 | De Jonge et al. | 23—273 SP |
| 3,078,151 | 2/1963 | Kappelmeyer | 23—301 SP |
| 3,096,158 | 7/1963 | Gaule et al. | 23—301 SP |
| 3,241,925 | 3/1966 | Cakenberghe | 23—301 |

NORMAN YUDKOFF, Primary Examiner

S. SILVERBERG, Assistant Examiner